(No Model.)

J. D. TRACY & J. F. PLATT
FODDER SHREDDER.

No. 557,727. Patented Apr. 7, 1896.

UNITED STATES PATENT OFFICE.

JOHN D. TRACY AND JAMES F. PLATT, OF STERLING, ILLINOIS.

FODDER-SHREDDER.

SPECIFICATION forming part of Letters Patent No. 557,727, dated April 7, 1896.

Application filed September 16, 1895. Serial No. 562,676. (No model.)

*To all whom it may concern:*

Be it known that we, JOHN D. TRACY and JAMES F. PLATT, citizens of the United States, residing at Sterling, in the county of Whiteside and State of Illinois, have invented certain new and useful Improvements in Fodder-Shredders, of which the following is a specification.

Our invention relates to fodder-shredders, and has for its object to improve and simplify their construction and arrangement of parts, whereby improved results are attained; and our invention consists in the features of construction and arrangement hereinafter more particularly pointed out.

Figure 1:
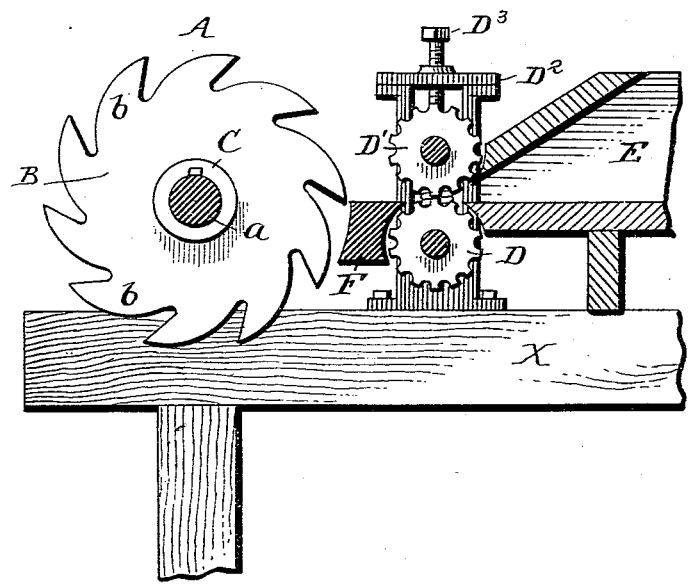
Figure 2:
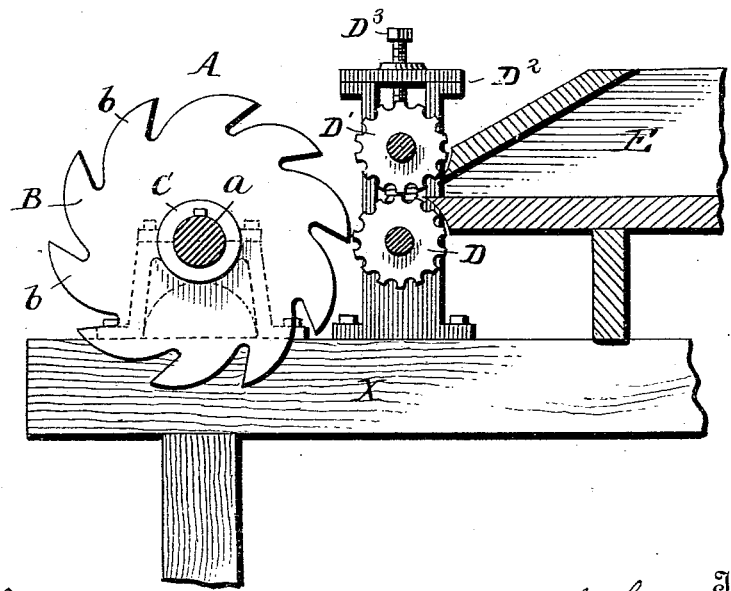

In the accompanying drawings, Figure 1 is a part-sectional view showing the general construction and arrangement of the shredding or cutting head, feed-rolls, and breaker or shear bar; and Fig. 2 is a similar view showing our improved arrangement of these parts.

Heretofore in the manufacture of shredders and feed-cutters and the like, embodying a feed-table, feed-rollers, and a shredding or cutting head, it has been customary to provide between the feed-rollers and cutting-head a breaker or shear bar, against which the shredders and cutters work, and this breaker or shear bar has been variously constructed and arranged, which need not be specifically set forth herein. We have discovered that this arrangement is open to certain objections, and that these objections can be overcome by the construction and arrangement hereinafter described, in which the essential feature consists in arranging the shredder or cutter head in immediate relation to the lower feed-rollers, whereby the points of the teeth of the cutters are brought into their closest approach to said rollers. By this arrangement we are enabled to do away with any breaker or shear bar interposed between the feed-rollers and cutter-head.

Referring more particularly to the drawings, A represents a shredder or cutter head comprising a shaft $a$, which is arranged to be driven by any suitable power, on which shaft are mounted a series of knives, saws, or cutters B, having teeth $b$, and the knives or cutters being separately spaced by a washer C, or otherwise arranged on the shaft at regular intervals in a manner well understood, and the whole is mounted upon a suitable framework X, preferably carrying the driving mechanism. The knives or cutters may be spirally arranged on the shaft, or may have the teeth variously bent or otherwise formed in any well-known way, as the particular form or construction of the cutters forms no essential feature of our invention. Also mounted on the framework are the feed-rolls D D', and these are of various forms and constructions, either plain or grooved or otherwise, and are supported in standards $D^2$ and have means $D^3$ for adjusting their relations to each other, and are also arranged to be driven from the source of power. (Not shown.) Also mounted on the frame is a feed-board E, upon which the cornstalks or other material to be shredded is placed to be delivered to the feed-rolls and by them carried forward to the shredder-head.

In all constructions heretofore made, so far as we are aware, it has been deemed necessary to provide a breaker or shear bar F, interposed between the cutter-head and feed-rolls, and against which the cutters operate.

We have found that when the cornstalks or other material is fed through the feed-rolls in a wilted condition they will wrap around the lower roll, and the space between the lower roll and the breaker or shear bar will become packed full of the stalks, which interferes with the operation of the machine, requiring it to be stopped and the material removed, sometimes requiring the machine to be taken apart. We have found that by arranging the shredder-head in direct connection or juxtaposition with the feed-rolls, this objection is avoided, the machine simplified, reduced in cost, and greatly improved. Thus, as shown in Fig. 2, the shredder-head A is mounted as before, but arranged so that its teeth impinge, or practically so, upon the periphery of the lower feed-roll D. In this arrangement the lower feed-roll serves the double purpose of a feed-roll and a breaker or shear bar.

In all shredding-machines the speed of the knives or saws at their peripheries or teeth is much faster than the surface speed of the feed-rolls, and in this way the cornstalks or other material is thoroughly shredded, and the leaves and shredded parts are stripped and carried away from the feed-roll as fast as they pass through the rolls, so that it is an impossibility for them to wrap around the roll, and there is no possibility of their accumulating thereon to choke or pack the roll, as in the old construction, when the breaker or shear bar has been used.

In our construction we preferably arrange the shredder-head in such relation to the feed-rolls that the center or axis of the saws or cutters is practically in the same horizontal plane with the center or axis of the lower feed-roll, as this, we find, gives the best results in practice and is the simplest and cheapest construction. Further, we find that by adjusting the shredder-head in the defined relations to the feed-rolls the material is more perfectly and completely shredded or stripped and is in a more uniform condition, which much resembles short hay, and which may be handled and treated in a manner similar to the handling and treating of hay.

It will be seen that the lower feed-roll, in addition to its function as a feed-roll, performs the function of the ordinary breaker or shear bar, and is in reality a cylindrical revolving breaker which coöperates with the cutter-head to perform the shredding operation.

From the above it will be seen that we have described the general principles of our invention and illustrated one embodiment thereof, and it will be evident that those skilled in the art can apply the principles to shredders and like machines having different forms of cutters and feed-rolls and still attain the advantages of our improvement without departing from the spirit of our invention.

What we claim is—

1. The combination of the feed-table, the feed-rolls, and the rotating shredder-head comprising toothed saws or cutters, the shredder-head being arranged in immediate relation to the lower feed-roll whereby the points of the teeth of the cutters are brought close to the said feed-roll, substantially as described.

2. The combination of the feed-table, the feed-rolls, and the rotating shredder-head comprising toothed saws or cutters, the cutters being arranged in immediate relation to the lower feed-roll, and the axis of the shredder-head and lower feed-roll being in the same horizontal plane, whereby the points of the teeth of the cutters are brought into their closest approach to said roll in said plane, substantially as described.

In testimony whereof we have signed our names to this specification in the presence of two subscribing witnesses.

JOHN D. TRACY.
JAMES F. PLATT.

Witnesses:
SAMUEL J. HARVEY,
T. Y. DAVIS.